STORAGE AND SWITCHING APPARATUS FOR AUTOMATIC TELEGRAPH SIGNALLING SYSTEMS

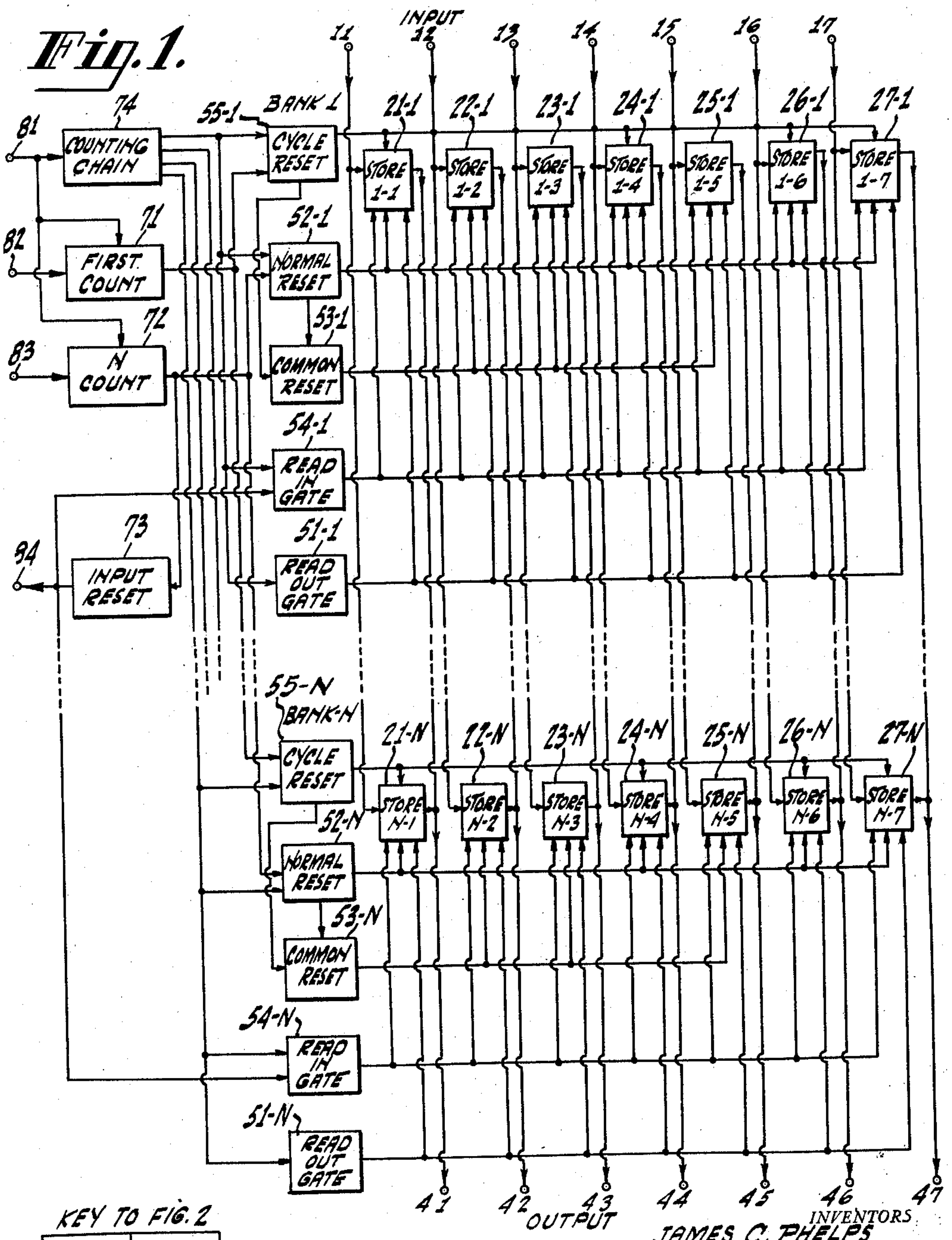
Fig. 1.
KEY TO FIG. 2
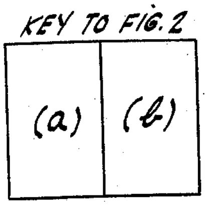
INVENTORS
JAMES C. PHELPS
DOMINICK MANDATO, JR.
ANTHONY LIGUORI AND
ARTHUR EUGENE CANFORA
BY Charles H. Brown
ATTORNEY INVENTORS
JAMES C. PHELPS
DOMINICK MANDATO, JR.
ANTHONY LIGUORI AND
ARTHUR EUGENE CANFORA
BY Charles H. Brown
ATTORNEY Sept. 8, 1959 J. C. PHELPS ET AL 2,903,513

Filed Sept. 14, 1953 3 Sheets-Sheet 3

INVENTORS
JAMES C. PHELPS
DOMINICK MANDATO, JR.
ANTHONY LIGUORI AND
ARTHUR EUGENE CANFORA

BY Charles H. Brown
ATTORNEY

United States Patent Office 2,903,513

Patented Sept. 8, 1959

2,903,513

STORAGE AND SWITCHING APPARATUS FOR AUTOMATIC TELEGRAPH SIGNALLING SYSTEMS

James C. Phelps, Woodcliff Lake, N.J., Arthur E. Canfora, Brooklyn, N.Y., Anthony Liguori, Hackensack, N.J., and Dominick Mandato, Jr., Mount Vernon, N.Y., assignors to Radio Corporation of America, a corporation of Delaware Application September 14, 1953, Serial No. 379,826

14 Claims. (Cl. 178—17.5)

Figure 2A:
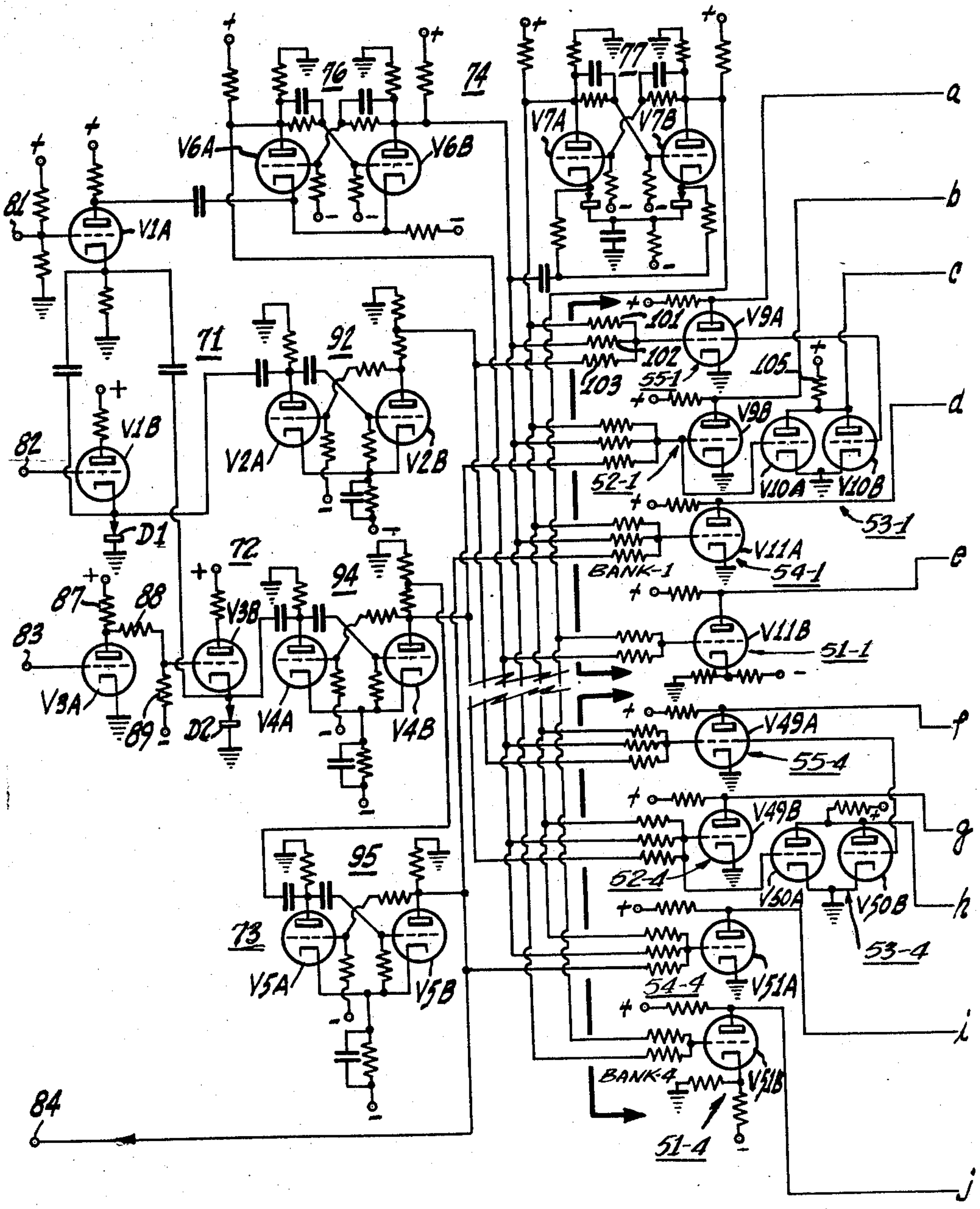

The invention relates to automatic request and repetition telegraph signalling systems. More particularly, the invention relates to an electronic circuit arrangement adapted to store signal information for indefinite periods of time, the signal information being made available by the circuit for possible subsequent use in associated apparatus.

At present there is a system of multiplex radio telegraphy which involves a plurality of telegraph channels transmitted in one direction between two stations and a like number of channels transmitted in the opposite direction between the same two stations. Normally transmission takes place simultaneously in both directions and, to a great extent, independently as well. Circuitry is provided in each channel at the receiving equipment of the respective stations to check the incoming signals for possible mutilation of individual characters. This circuitry is so arranged that upon one of the stations detecting the reception of a mutilated character, transmission from that station over an associated transmitting channel is halted and a signal requesting repetition of the character received mutilated is transmitted to the other station. The receiving equipment at the other station functions in response to the signal to cause the transmitting equipment at the other station to repeat the transmission of the character under consideration. This character is available for such repetition because in accordance with the basic principles of an automatic telegraph signalling system each station includes equipment adapted to store the characters as they are transmitted by the respective stations over the channels for a time period equal to the transmission time of predetermined number of characters. The circuit arrangement according to the invention is used for this storing purpose.

Signal element storage systems are known. The early known systems employed relays for storing each of the signal elements with further relays for switching purposes. Other systems used perforated paper tape or magnetic recording tape with improved results. The mechanical limitations of the over-all apparatus and damage to the moving tape on repeated cycling led to the use of capacitor storage and relay switching arrangements. All of these prior art arrangements were unsatisfactory from several standpoints; mainly the inability to handle telegraph signalling elements at the desired speed of operation and the excessive maintenance required. In the case of capacitor storage, failure of the system due to leakage of the capacitors has required complex equipment for maintaining the storage on the capacitors at the necessary levels for proper utilization.

An object of the invention is to obtain an improved circuit arrangement adapted to store signal information for an indefinite period of time.

Another object of the invention is to store the component signal character elements electronically for an indefinate period of time without any possibility of failure of the over-all circuit due to leakage, stray magnetic field effects, or deterioration of the storing medium.

Another object is to provide an electronic switching arrangement for regular cyclic access to several groups of stored character signal elements without changing or otherwise impairing the sense of the stored intelligence.

A further object of the invention is to provide an electronic storage switch having relatively rapid response characteristics operable over a wide range of switching rates.

Still another object is to provide visual indication of the stored signal elements as well as visual indication of the particular bank of storage elements connected into the circuit at any given instant.

The objects of the invention are obtained in an electronic circuit arrangement comprising a plurality of electronic storage devices or signal element stores arranged in a predetermined number of groups or character storage banks, each bank having associated therewith a plurality of electronic gating and operating pulse timing circuits for injecting information into, ejecting or abstracting information from, and resetting the individual stores. Electronic circuitry is provided for operating the banks in cyclical order, the information being injected into and abstracted from the banks in accordance with the requirement therefore made by the over-all telegraph signalling system in response to the operation of other electronic circuitry associated with all of the character storage banks.

Currents corresponding in nature to the individual signal elements of a fixed-length code character obtained from associated code handling apparatus are applied over separate circuits to a plurality of input terminals. The input terminals are each connected in common to the corresponding storage devices or element stores in each of N character storage banks. Each group of corresponding element stores is also connected in common to one of a plurality of output terminals. Each bank of element stores has associated therewith five electronic gating circuits. Three operating pulse timing circuits and a timing wave generator are connected in common to all of the character storage banks. In response to a synchronizing pulse derived in prearranged time relationship to the operation of the telegraph signalling system, the timing wave generator applies a plurality of harmonically related timing waves to the various gating circuits to select the banks cyclically for placing into and taking out elements from the element stores in each character bank under the influence of the operating pulse timing circuits.

The circuit timing is arranged so that signal intelligence will be presented at the input terminals at least prior to the occurrence of the synchronizing pulses which are delivered at character rate, the signal intelligence, being read out at the output terminals shortly after the occurrence of the synchronizing pulses. The intelligence momentarily presented at the input terminals will remain available at the output terminals for presentation to the associated apparatus until information from the over-all telegraph system indicates that it is no longer needed. The synchronizing pulse is also delivered to a first count gate and an N-count gate forming part of the operating pulse timing circuit, simultaneously with application to the timing wave generator.

The circuit is arranged so that one of the operating pulse timing circuits, the first count gate, requires a pulse at the "first count of cycling" information in coincidence with the synchronizing pulse in order to be operated. In the non-cycling condition the first count gate will remain closed. Another of the operating pulse timing circuits, N-count gate, however, is arranged so that the synchronizing pulse is applied to three of the storage bank gating circuits, namely a read-out gate, a normal reset gate and a common reset gate to actuate all of these gates simultaneously in the storage bank under consideration. The read-out gate is held active until the occurrence of the next synchronizing pulse, while the normal and common reset gates respectively are activated for only a short period. This pulsed activation of the normal and common reset gates is arranged so that all of the element stores of the storage bank under consideration assume a given condition regardless of the potentials presented at the input terminals.

At the conclusion of this reset pulse from the N-count gate, an activating transition is delivered to a further one of the operating pulse timing circuits, the input reset, the circuit, which, in turn, delivers a timed pulse to another of the storage bank gating circuits, the read-in gate. When the read-in gate is activated the element stores are momentarily connected to the respective input terminals. The sense of each element as stored is assumed to be of given nature unless potential to the contrary is presented at the input terminals. At the conclusion of the timed read-in pulse an activating transition is delivered to an output terminal for use by the signalling device which applies signal to the input terminals to present the succeeding character elements thereto.

The read-out gate requires only the operation of the timing wave generator for activation, and holds all of the element stores in the storage bank under consideration in readiness for the read-out function for time duration equal to a full character of transmission time over the telegraph signalling system. The potentials at the output terminals will correspond in sense to the potentials applied to the input terminals. Thus, in effect, new character intelligence is placed in the element stores and immediately thereafter transmitted. The second through Nth storage banks are similarly activated, each in turn being effectively connected to the input terminals and the output terminals in the regular "non-cycling" order of operation. When the next local timing pulse is applied to the timing wave generator, all of the gates in the preceding character storage bank are deactivated by the advance of the timing wave generator and the elements in the stores remain in storage indefinitely.

The circuit is arranged so that on the arrival of the next synchronizing pulse following the appearance of potential termed "cycling information" and another "first count of cycling" potential, the circuit arrangement will "cycle." The "first count of cycling" potentials endure for one character interval only while the "cycling" potentials endure for "N" character intervals, with the leading edges of the two potential plateaus coincident. Thus on the occurrence of the first synchronizing pulse following the application of "cycling information," the first count gate is activated and the N-count gate is simultaneously deactivated.

The first count gate passes a timed pulse to the cycle reset gate of the storage bank under consideration which in coincidence with a transition from the timing wave generator causes certain prearranged element stores to assume a condition representative of elements of given nature. Simultaneously the common reset gate of the storage bank under consideration causes the remaining element stores to assume a condition representative of elements of nature opposite to said given nature, thereby establishing a predetermined signal character in storage.

Inasmuch as the first count information pulse endures only for a single character interval, only one storage bank of the circuit arrangement will be reset to the prearranged signal, the other storage banks retaining the text information originally presented thereto for storage. The deactivation of the N-count gate during the first character interval, as well as the second to $n$th character intervals, prevents the normal reset gate, the read-in gate and the input reset gate from operating so that there will be no read-in of new signal elements nor the destruction of the original text information that was available just prior to the application of the cycling information pulse for a period equal to $n$ synchronizing pulse intervals. The read-out gates are activated in the normal manner to allow repeated transmission of the signal characters stored in the $n$ storage banks. Thus the first character transmitted after the incidence of cycling information is the predetermined character forced into the storage bank by the cycle reset gate followed in sequence by the characters stored previously in the remainder of the storage banks.

According to the invention each individual signal element store includes a two-electrode glow-discharge device connected in series with a resistive element and a diode unilateral conduction device across a source of operating potential. Negative pulses to extinguish the glow-discharge are applied across the resistive element, or across only a part of this resistive element. Alternately, positive pulses may be applied across the series circuit comprising the resistance element and the glow-discharge device to extinguish the glow-discharge device and cause current to stop flowing in the series circuit. Negative pulses may be applied across the series circuit comprising the resistive element and the glow-discharge device to initiate current flow and the glow-discharge. An input device comprising a triode vacuum tube and cathode resistance elements is connected in series across a source of operating potential. The anode of the input triode is coupled to the negative pulse extinguishing electrode of the glow discharge device by means of a capacitor. Input information is applied between the grid of the input device and ground and a negative read-in pulse is applied to the cathode of the triode tube to store the information in the glow-discharge device. An output device is constituted by another triode vacuum tube having the cathode connected to the above mentioned negative pulse extinguishing electrode of the glow-discharge device and a resistive element connected between the anode and ground across which element the output potential is obtained. The control grid of the output gate is coupled to the source of read-out enabling potential.

Alternately, one of the glow-discharge circuits described and illustrated in the copending U.S. patent application Serial No. 375,013 filed August 18, 1953, on behalf of Arthur E. Canfora and Samuel Sharin for Locking Circuits, now abandoned, may be adapted to serve as an element store according to the invention instead of the circuit described above.

Figure 2B:
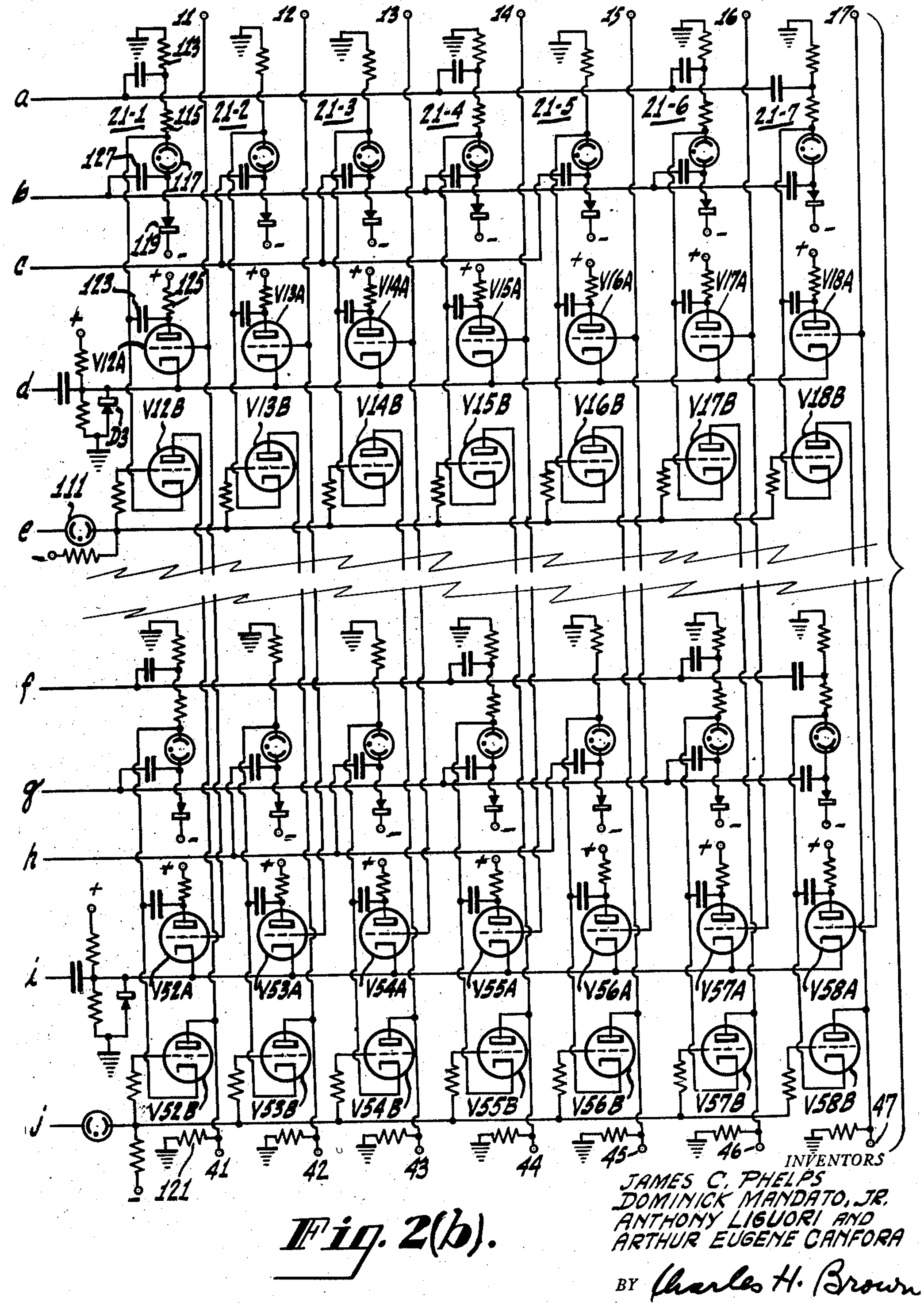

In order that the invention may be clearly understood and readily put to practical use, a circuit arrangement embodying the invention is hereinafter described, by way of example only, with reference to the accompanying drawing in which:

Fig. 1 is a functional diagram of a storage and switching apparatus according to the invention; and Fig. 2 is a schematic diagram of a storage and switching apparatus based on the arrangement illustrated in Fig. 1.

Referring to Fig. 1 there is shown a functional diagram of a circuit arrangement according to the invention for storing, as they are transmitted, the signal elements of a predetermined number of code signal characters. The signal elements are stored for a period of time equal to the repetition rate or time required for the transmission of that number of characters. If transmission is halted, the signal elements are stored until information is had indicating that the characters have been correctly received. Currents representative of the individual signal elements of a code character, obtained, for example, from a transmitting distributor or code translator (not shown), are applied over separate circuits to a plurality of input terminals 11—17. Each of the input terminals is connected in common to the corresponding storage device or element store of all of the character storage banks, and the respective stores are also connected in common to the individual output terminals 41—47. Only two character storage banks—the first and the last—are actually shown in Fig. 1. However, according to the invention any number of banks may be accommodated. For example, the first signal element input terminal 11 is connected in common to the first signal element stores 21–1 through 21–N of all of the storage banks 1–N and all of the element stores 21–1 through 21–N of all of the storage banks 1–N are also connected to the first signal element output terminal 41.

Each bank of stores has associated therewith five electronic gating circuits; 51–55 being shown for bank 1 and 51N–55N for bank N. Three operating pulse gating and timing circuits 71–73 and a timing wave generator in the form of a counting chain 74 are connected in common relationship to all of the character storage banks. In response to a synchronizing pulse, derived from the associated apparatus in prearranged time relationship to operation of the telegraph signalling system and presented at the terminal 81, the counting chain 74 generates a plurality of harmonically related timing waves which operate the various gating circuits to activate the character storage banks 1–N cyclically for placing into and taking out energy indicative of code character signal elements from the element stores in each bank.

*Non-cycling operation*

The synchronizing pulses applied to the synchronizing pulse input terminal 81 are delivered at character rate. The circuit is arranged so that code character elements will be presented at the input terminals 11—17 at least prior to the occurrence of the synchronizing pulse and the same elements will be read out at the output terminals 41—47 just after the arrival of the synchronizing pulse. The same elements as presented at the input terminals will therefore remain available at the output terminals for presentation to the subsequent utilization circuits until information from the over-all telegraph signal system indicates that it is no longer needed. The local timing pulse or synchronizing pulse is delivered to the first count gate 71 and the N-count gate 72 simultaneously with application to the counting chain 74.

The circuit is arranged so that the first count operate pulse timing circuit 71 requires a pulse at the "first count of cycling" information delivered at the terminal 82 in coincidence with the synchronizing pulse input at the terminal 81 in order to be operated. In the non-cycling condition the first count circuit will not be activated. The N-count operate pulse timing circuit 72, however, is arranged to pass the synchronizing pulse applied to terminal 81 to the read-out gates 51–1 through 51–N, the normal reset gates 52–1 through 52–N and the common reset gates 53–1 through 53–N so that these gates are actuated simultaneously. The harmonically related timing waves from the counting chain 74 are permuted among the gating circuits 55–1 through 51–N so that only those circuits forming a part of the character storage bank under consideration are active at any one time. The read-out gates 51–1 through 51–N are held active until the occurrence of the next synchronizing pulse while the normal and common reset gates 52–1 through 52–N and 53–1 through 53–N respectively are activated for only a short period. This pulsed activation of the normal and common reset gates 52 and 53 causes all of the signal element stores of the storage bank under consideration, for example the stores 21—27 of the first storage bank, to assume a signal element condition of given nature regardless of the potentials presented at the input terminals 11—17.

At the conclusion of this reset pulse from the N-count gate 72, an activating transition is delivered to the input reset gate 73 which, in turn, delivers a timed pulse to the read-in gate 54. When the read-in gate 54 is activated, the stores 21–1 through 21–7 are momentarily connected to the respective input terminals 11—17. When spacing potential is applied to any one of the terminals 11—17, the corresponding store is returned to the spacing condition. In other words, the sense of each element is assumed to be marking unless space potential to the contrary is present at the input terminals. Obviously, however, a circuit can be made to operate in the opposite sense according to the invention, if such is desired. At the conclusion of the timed read-in pulse an activating transition is delivered to the reset output terminal 84 for use by the signal input device which applies signal inputs to terminals 11—17. In the automatic signalling system previously mentioned the output reset pulse at terminal 84 is applied to a cycling control unit and a five-to-seven-unit code converter for the purpose of presenting the next character at the signal element input terminals 11—17.

The read-out gate 51, requires only the operation of the counting chain 74 for activation, and sensitizes all of the element stores in the storage bank under consideration for the full time interval between the advent of the first local timing pulse and the following local timing pulse. Thus output potentials from the storage bank under consideration are simultaneously presented on the output terminals 41—47 for the time duration equal to a full character transmission time over the multiplex signalling telegraph system. The potentials at the output terminals 41—47 will follow the reset to mark as well as the read-in pulsing, but since these two functions are timed to be completed before any utilization of the output potential is made, this disturbance is fully obviated at the utilization time when the output potentials at the output terminals 41—47 will correspond in sense to the read-in potentials at the input terminals 11—17. Thus, in effect, new character intelligence is placed in the element stores, for example the element stores 21—27 of the storage bank, and immediately thereafter transmitted. When a second local timing pulse appears at the terminal 81, all of the gates in the first storage bank are deactivated by the advance of the counting chain 74 and the elements stored in the stores 21—27 remain in storage indefinitely.

The second through Nth storage banks are similarly activated, each in turn being effectively connected to the input terminals 11—17 and the output terminals 41—47 in the regular "non-cycling" order of operation.

*Cycling operation*

The automatic signalling system with which the circuit arrangement shown in Fig. 1 cooperates is arranged so that when the next local timing pulse is received at the terminal 81 following the appearance of a pulse termed "cycling information" at the terminal 83 and the appearance of another pulse termed the "first count of cycling" at the terminal 82, the system will "cycle" as described and illustrated in the copending U.S. patent application Serial No. 379,859, filed September 14, 1953, on behalf of Arthur E. Canfora for Electronic ARQ Cycling Counter, issued as Patent Number 2,735,889 on February 21, 1956. Pulses applied to the first count terminal 82 endure for one character interval while the cycling information pulse applied to terminal 83 will endure for N character-intervals, with the leading edges of the two pulses coincident. Thus on the occurrence of the first local timing pulse, following the application of "cycling information" the first count gate 71 is activated and simultaneously the N-count gate is deactivated.

The first count gate 71 passes a timed pulse to the cycle reset gate 55 of the storage bank under consideration which in coincidence with a transition from the counting chain 74 causes signal element stores 1–1, 1–4, 1–6 and 1–7 to assume the spacing condition. Simultaneously the common reset gate 53 of the storage bank under consideration causes the signal element stores 1–2, 1–3 and 1–5 to assume the marking condition, thereby to establish a predetermined signal character in storage for transmission to control the operation of the automatic request and repetition telegraph signalling system. Obviously the several stores may be reset in different manner in order to establish a different code character for this purpose.

Inasmuch as the first count information pulse applied to terminal 82 is present for a single character interval, only one storage bank of the circuit arrangement will be reset to the prearranged signal, the other storage banks merely retaining the text information originally presented thereto for storage. The deactivation of the N-count gate 72 during the first character interval, as well as the second to Nth character intervals, prevents the operation of the normal reset gate 52, the read-in gate 54 and the input reset gate 73. Accordingly, for an interval equal to N timing pulses there will be no read-in of new signal elements nor the destruction of the original information that was stored just prior to the application of the cycling information pulse and the following local timing pulse to the terminals 83, 82 and 81. The read-out gates 51–1 to 51–N are activated in the normal manner.

Thus the first character transmitted after the occurrence of cycling information pulses at the terminal 83 is the predetermined character forced into the storage bank by the cycle reset gate 55 which character is followed in sequence by the characters stored previously in the remainder of the storage banks.

Fig. 2 shows in schematic form a circuit diagram for carrying out the functions outlined in connection with the explanation of Fig. 1. In this arrangement seven unit code characters are stored in four storage banks, of which only two are shown, but in accordance with the basic principles of the invention any number of storage banks may be used to accommodate the signal elements of any number of code characters. The synchronizing pulse is applied at the terminal 81 and thence to the grid of a triode vacuum tube V1A which is connected as a paraphase amplifier producing both positive and negative pulses of sufficient amplitude for application to separate succeeding circuits. The first count gate 71 includes triode tubes V1B, V2A and V2B. The tube V1B is normally conducting in the absence of first count cycling information. Hence the diode D1 in the cathode presents a low impedance to the input pulses delivered from the previous tube V1A which are effectively taken to ground by conduction of the diode D1. Tubes V2A and V2B are connected in conventional monostable reciproconductive circuit configuration. The term "reciproconductive circuit" as employed herein is construed to include all two tube regenerative circuit arrangements in which conduction alternates in one or the other tube. When considering the "free running" or "astable" circuit, the term is synonomous with the broad term "multivibrator," which term is herein limited to the astable reciproconductive circuit. The monostable reciproconductive circuit which requires one triggering pulse to switch from the single stable state of conducting to the single unstable state and return is occasionally referred to as a monostable multivibrator and often referred to as a trigger circuit though not consistently distinguishing from the bistable multivibrator. The bistable reciproconductive circuit, which is one which requires two triggering pulses to switch from one stable state to the other stable state and return, sometimes termed a "locking circuit," can be one of two types. One type, the "lockover" reciproconductive circuit has two trigger input terminals and requires triggering at alternate terminals to reverse the state of conduction, whereas the other type, the "binary" reciproconductive circuit has a single terminal and the conductivity is reversed upon each application of triggering potential to the one terminal.

Because of the grounding of the input pulses from the tube V1A, no triggering pulse is applied to the cycle reset reciproconductive circuit 92. It, therefore, remains inactive. Had there been cycling information, in the nature of a negative pulse applied to the terminal 82 coupled to the grid of the triode tube V1B which was sufficient to cut this tube off, the diode D1 connected to the cathode of the tube V1B would present a high impedance and the negative transitions from the cathode of the tube V1B would be passed relatively unimpeded to the cycle reset pulse generator circuit 92 causing it to be triggered to the unstable state of conduction. The time duration positive pulse resulting from the triggering of the cycle reset pulse generator 92 is applied to the coincidence grids of the tubes V9A to V49A which form the cycle reset gate 55–1 to 55–4 of all four storage banks. The four-count gate 72 comprises the amplifier-inverter tubes V3A and V3B and the normal reset pulse generator 94 comprising the tubes V4A and V4B. The four-count gate has essentially the opposite characteristics of the first count gate. The tube V3A is normally conducting in the absence of four-count cycle information so that the anode of the tube V3A is normally at low positive potential. This low positive potential is applied to the grid of the tube V3B through a voltage divider including resistors 88, 89 whereby the tube V3B is normally blocked permitting negative transitions from the tube V1A cathode to pass directly to the normal reset pulse generator 94. Two outputs are taken from the normal reset pulse generator 94. A positive pulse is obtained from the anode of the tube V4B and applied to the coincidence grids of the normal reset gates 52–1 through 52–4 of all of the storage banks. A similarly timed pulse of lesser amplitude is obtained from the load resistor of the tube V4B and applied to a read-in pulse generator 95 which is a part of the input reset gate 73 to be described hereinafter in further detail.

The input reset gate 73 comprises a read-in pulse generator 95 comprising triode vacuum tubes V5A and V5B connected in the conventional monostable reciproconductive circuit configuration. The read-in pulse generator 95 is activated by the negative going transition obtained from the normal reset pulse generator 94. Therefore, read-in pulse generator 95 is activated immediately after the normal reset action has been completed. The positive pulse output of the read-in pulse generator is delivered to the coincidence grid tubes V11A to V51A of the read-in gates 54–1 to 54–4 of the four storage banks. The output terminal 84 is intended for connection to external circuitry (not shown) to supply information as to the time when the read-in pulsing has been completed so that the external circuitry may then be triggered to change the character elements presented at the input terminals 11—17 for the next succeeding character.

The counting chain 74 comprises a pair of bistable reciproconductive circuits having tubes V6A, V6B and V7A, V7B connected in the conventional bistable reciproconductive circuit configuration. The two reciproconductive circuits 76 and 77 are connected in cascade to provide the count-of-four counting chain 74. The four anodes of the tubes V6A through V7B are connected in appropriate permutations by means of resistors to the control elements of the various gating tubes in such permutations as to open and close the gates at the times required. In each bank there are three "and" gates—the normal reset gate 52, the common reset gate 53, and the read-in gate 54. Each of the gates comprises a triode vacuum tube having the control grid operating in "triple coincidence." Triple coincidence is obtained by obtaining two or three activating potentials from the outputs of the counting chain 74 by means of resistors as described and obtaining the third or triggering potential from the appropriate control apparatus. For example, the cycle reset gate 55 comprising the tube V9A is triggered by two relatively positive potentials obtained from the counting chain 74 by way of resistors 101 and 102 and another positive pulse from the cycle reset pulse generator 92 by way of the resistor 103. Only when all three of the potentials applied by resistors 101 through 103 are positive will the cycle reset gate 55 be activated or rendered conducting. The negative transition produced at the anode of the cycle reset gate tube V9A is simultaneously coupled into the stores 21–1, 21–4, 21–6 and 21–7 in such manner as to cause these stores to be in the spacing element state of conduction as will be explained in detail hereinafter.

Each normal reset gate 52, for example 52–1 comprising the triode vacuum tube V9B, requires the same two relatively positive potentials obtained from the counting chain 74 plus a third positive pulse obtained from the normal reset pulse generator 94 in order to activate or render the tube V9B conducting. Negative transition obtained at the anode of the tube V9B is simultaneously applied to the stores 21–1, 21–4, 21–6 and 21–7 in such manner as to cause these stores to go to the "marking" condition as explained in detail hereinafter. It should be noted here that either the cycle reset 55 or the normal reset 52 will be activated at any given time but never will both be activated together.

Each common reset gate 53 consists of two triode vacuum tubes, V10A and V10B for example in bank 1, having a common anode load resistor. When either tube V10A or V10B is rendered conducting, the negative transition developed across this common resistor 105 is simultaneously coupled into the stores 21–2, 21–3 and 21–5 in such manner as to cause them to conduct in the marking element state. The tube V10A is activated together with the normal reset gating tube V9B, while the tube V10B is activated together with the cycle reset gating tube V9A. Thus if either cycle or normal reset is activated element stores 21–2, 21–3 and 21–5 are placed in the "marking element" state of conduction.

Each read-in gate 54, for example the read-in gate 54–1 of the first storage bank comprising the triode tube V11A, also requires two relatively positive potentials from the counting chain 74 just as the previously described reset gates, but responds to the positive pulse obtained from the read-in pulse generator 95. When activated in this manner, the negative transition at the anode of the tube V11A is coupled into all of the stores 21 of a given bank of element stores, thereby sensitizing each store so that it may respond to any spacing potential on the associated corresponding lead to the input terminals 11—17 but will remain dormant for any marking potential on these leads as will be explained hereinafter.

The read-out gates 51, for example the gate 51–1 of the first storage bank comprising the triode vacuum tube V11B, function in the inverse manner to their companion gates. Each read-out gate 51 is normally conducting except during the interval when it is activated by the coincidence voltages obtained from the counting chain 74, that is when the bank of stores in which the gate is a part is selected for activation or read-in and read-out. During this interval the two most negative potentials which can be obtained from the counting chain 74 are applied to the grid of the tube V11B to block the tube. The cathode of the tube V11B is biased so that the grid potential has a value which is normally 75 percent of the most negative potential obtainable from the output of the counting chain 74. Thus whenever the counting chain is in proper phase for selecting a particular bank of stores, the read-out gate 51 of that bank is blocked, for example the read-out gating tube V11B of read-out gate 51–1. When the read-out gating tube V11B is blocked, the potential at the anode rises in a positive direction to a value sufficient to cause the glow discharge device 111 to ignite. The ignition of the glow discharge device 111 sensitizes the output reading portion of the stores 21 of the particular bank of stores under consideration. The operation of the stores 21 is based on the characteristic of glow discharge devices that a relatively high potential is required to cause the glow discharge device to ignite, or pass current, but some lesser operating potential will maintain the device in a conducting condition when once ignited. It is also of advantage that there is a substantially constant voltage drop across the terminals of the glow discharge device over a rather wide range of current values.

All of the stores of the circuit arrangement according to the invention are of the same configuration. The store 21–1 of bank 1 will be described as an example of the construction of the stores. Two resistors 113 and 115, a dual-electrode glow discharge device 117 and a diode element 119 are connected in series in the order named across a source of potential with the positive pole of the potential source at ground and the negative pole of the potential source at the cathode of the diode element 119. Preferably the glow discharge device 117 is a neon filled lamp such as the type 996 or NE96 and the diode element 119 is a germanium diode such as the type 1N34A, but other equivalent devices may be used to advantage. The negative potential on the cathode of the diode element 119 is somewhat greater than the operating level required for the particular glow discharge device used but less than the striking voltage for that same type of glow discharge device. With no current flowing in the series circuit, the potential at the point between the resistor 115 and the glow discharge device 117 will be at ground and the potential between the glow discharge device 117 and the diode 119 will be at the operating potential across the neon glow discharge device 117. If for a moment an increment of voltage at least equal to the difference between the striking and operating potential of the glow discharge device 117 is applied to the junction between the glow discharge device 117 and the diode element 119 and is of the same polarity as the operating supply and if the impedance of the series circuit between that junction point and the operating potential source will permit, as the diode element 119 does, there will be a potential greater than the striking potential momentarily existing across the glow discharge device 117 and current will flow to ignite the glow discharge device. If this applied increment at the junction between the glow discharge device 117 and the diode element 119 be removed, the junction will return to the original operating level but the junction between the resistor 115 and the glow discharge device 117 will be at a voltage equal to the operating level less the constant voltage drop across the glow discharge device 117. Thus the level of voltage at the junction between the series resistors 113 and 115 and the glow discharge device 117 will be at ground potential if the glow discharge device is not conducting and at some potential remote from ground if the glow discharge device is conducting or is ignited. The junction between the resistor 115 and the glow discharge device 117 is connected to the cathode of a triode read-out tube V12B. The anode of the read-out tube V12B is connected to ground through a resistive element connected to the output terminal 41. This resistive element is usually found in the associated apparatus connected to the output terminals 41 through 47. However, in interest of clarity a resistor 121 is shown connected between the terminal 41 and ground. Current will flow in the resistor 121 if the voltage on the cathode of the tube V12B is at some negative value and the voltage on the grid of the tube V12B is at some potential positive with respect to the voltage on the cathode. The volage drop produced across the resistor 121 will roughly approximate the potential across the resistors 113 and 115.

Each read-out gate 51, for example the read-out gate 51–1 of the first storage bank comprising the triode tube V11B, is conducting except when the storage bank of which it is a constituent part is selected. The conduction of the tube V11B causes the grids of the output tubes V12B, V13B, . . . V18B to be biased to cutoff. However, when the tube V11B is blocked at bank selection time, the grids of the same element store output tubes go quite positive and any negative voltage on the associated cathode appears as a slightly less negative voltage on the corresponding output leads to terminals 41 through 47. Thus the potential delivered to the element store output terminal is indicative of the state of conduction of the glow discharge device in the element store under selection.

Assuming that the glow discharge device 117 is conducting, the electrode at the resistor 115 is at some relatively small negative potential with respect to ground. If, momentarily, this electrode can be made sufficiently negative to make the potential difference across the glow discharge device 117 less than the operating voltage of the type of glow discharge device in question, then the flow discharge device 117 will be extinguished and current will cease to flow through the series circuit. Thereafter, the electrode connected to the resistor 115 will return to ground potential and the glow discharge device 117 will remain extinguished. Such an extinguishing voltage can be obtained from the anode of an element store input tube V12A by way of a coupling capacitor 123. The triode tube V11A of the read-in gate 54–1 being normally blocked, permits the cathodes of the triode V12A, as well as the cathodes of the triode V13A, V14A, . . . V18A also, to ride at a nominal plus 20 volt level. While in this state of conduction, input grid potentials of ground or minus 20 volts have no effect on the grids of the tube V12A and others. However, when the tube V11A is pulsed conducting at the desired time, the negative transition from the anode of the tube V11A is coupled to the common input tube cathode leads causing the potential to fall downward. However, a diode D3 is arranged to clamp this cathode lead at ground potential. During the interval any element store input tube V12A through V18A having ground potential, corresponding to spacing signal potential, on the grid will conduct and extinguish the associated glow discharge device 117. In this manner spacing elements are read into the element stores of the selected storage bank.

Striking potential, obtained either from the normal reset gate 52 or the common reset gate 53 of each storage bank, for example the reset gate 52–1, comprising the gating tube V9B, and 53–1, comprising the gating tubes V10A and common reset gate V10B, is applied to the junction between the glow discharge device 117 and the diode 119 over a capacitor 127 to cause the glow discharge device 117 to ignite and pass current. The negative transition produced at the anodes of these reset gate tubes at selection time are individually coupled into the respective element glow discharge devices. The cycle reset gate 51–1 comprising the tube V9A supplies negative extinguishing pulses to the junction between the series resistors 113 and 115 to extinguish the glow discharge device 117 when required by the cycling sequence.

While the above described circuit arrangement is intended for storing signal elements obtained from a common set of input terminals for substantially immediate and possibly deferred read-out at a common set of output terminals, it is clearly within the scope of the invention to couple the element stores to individual sets of input terminals for read-in from multiple sources and read-out at a common set of output terminals or for read-in at common input terminals and read-out at multiple output terminals, such as would be desired in a character sequential multiplex telegraph system.

The invention claimed is:

1. Signal element character storage and switching apparatus including a number of signal character storage banks each having a plurality of signal element electronic storage circuits, means responsive to a received signal to cyclically select said storage banks, a plurality of input terminals connected to said signal element storage circuits, a plurality of output terminals connected to said signal element storage circuits, means responsive to another received signal to place each element storage circuit in the selected character storage bank in a given condition, means responsive to a further received signal to place said element storage circuits of the selected bank in conditions representative of potentials applied to the respective input terminals, and means responsive to another signal to deliver energy from the element storage devices to the respective output terminals.

2. A signal character storage circuit arrangement for character signals having $n$ elements, including a plurality of storing circuits divided into banks, each of said banks including $n$ storing circuits corresponding with the $n$ signal elements, the storing circuits being cross-classified into $n$ rows corresponding with the $n$ signal elements, each of said storing circuits including a resistive element, a dual-electrode glow discharge device and a diode element connected in series, means to apply operating bias potential across said series circuits, means to select said banks of storage circuits in cyclic order, means to apply $n$ input signal elements respectively across the resistive elements of all of the storing circuits in the corresponding $n$ rows, and $n$ output circuits coupled respectively to the resistive elements of all of the storing circuits in the corresponding $n$ rows to cyclicly derive signal character outputs from the corresponding banks.

3. The signal character storage circuit arrangement defined in claim 2, and in addition, means responsive to a received control signal to establish a predetermined code character in one bank of said storage devices.

4. A storage circuit for signal characters each composed of a plurality of signal elements, comprising, in combination, a plurality of storage banks each including a plurality of glow discharge devices, a counting circuit for placing said banks in condition for operation in a cyclical order, means for individually applying the signal elements in first one and then another signal character to corresponding devices in each of said banks, said counting circuit being arranged to place first one and then another of said banks in condition for operation according to said cyclical order as the signal elements in succeeding signal characters are applied to said devices, means for operating each of said devices in a storage bank when that bank is placed in condition for operation by said counting circuit to assume a given condition corresponding to the signal element applied thereto, and means for deriving from each of said devices in said last-mentioned bank an output signal according to said given condition of the device.

5. A storage circuit as claimed in claim 4 and wherein the number of glow discharge devices included in each of said storage banks is the same as the number of signal elements included in each of said signal characters.

6. A storage circuit as claimed in claim 4 and including means responsive to the reception of a control signal for operating each of said devices in the next one of said banks placed in condition for operation by said counting circuit following the reception of said control signal by said last-mentioned means to assume a predetermined condition, whereby an output signal according to said predetermined condition is derived from each of said last-mentioned devices by said deriving means.

7. A storage circuit for signal characters each composed of a plurality of signal elements, comprising, in combination, a plurality of signal element storage devices, means for individually applying the signal elements included in a signal character to said devices, a common reset gate coupled to predetermined ones of said devices, a normal reset gate coupled to the remaining ones of said devices, a read-in gate and a read-out gate both coupled to all of said devices, means for operating said common reset gate to reset said predetermined ones of said devices to a given condition, means for operating said normal reset gate to reset said remaining devices to said given condition, means for operating said read-in gate after the operation of said common and said normal reset gates to cause each of said devices to assume an operating condition corresponding to the signal element applied thereto, and further means for operating said read-out gate to derive from each of said devices an output signal according to said operating condition.

8. A storage circuit as claimed in claim 7 and wherein each of said signal element storage devices includes a glow discharge device, the signal elements in said signal character being of different nature, each of said devices being arranged to fire in response to a signal element of one nature and to be extinguished in response to a signal element of another nature.

9. A storage circuit as claimed in claim 7 and wherein a cycle reset gate is coupled to said remaining ones of said devices, means responsive to a control signal for operating said cycle reset gate to cause said remaining devices to assume a condition opposite from said given condition and for preventing the operation of said read-in gate, said read-out gate being operated by said further means to derive an output signal according to said opposite condition from each of said remaining devices and according to said given condition from each of said predetermined devices.

10. Apparatus as defined in claim 1 and wherein each of said input terminals is individually connected to a storage circuit in said selected character storage bank and to the corresponding storage circuit in each of the remaining character storage banks.

11. Apparatus as defined in claim 1 and wherein each of said output terminals is individually connected to a storage circuit in said selected character storage bank and to the corresponding storage circuit in each of the remaining character storage banks.

12. Apparatus as defined in claim 1 and wherein each of said input terminals is individually connected to a storage circuit in said selected character storage bank and to the corresponding storage circuit in each of the remaining character storage banks, each of said output terminals being individually connected to a storage circuit in said selected character storage bank and to the corresponding storage circuit in each of the remaining character storage banks.

13. A storage circuit as claimed in claim 4 and wherein each of said devices in said last-mentioned bank is arranged to remain in said given condition following the operation of said last-mentioned means to derive said output signals at least until said last-mentioned bank is again placed in condition for operation by said counting circuit.

14. A storage circuit as claimed in claim 7 and wherein each of said storage devices includes a resistive element, a dual-electrode glow discharge device and a diode element connected in series, means to apply operating bias potential across said series circuits.

References Cited in the file of this patent

UNITED STATES PATENTS

| | | |
|---|---|---|
| 1,832,118 | Hershey | Nov. 17, 1931 |
| 2,068,711 | Robinson | Jan. 26, 1937 |
| 2,132,654 | Smith | Oct. 11, 1938 |
| 2,348,016 | Michel | May 2, 1944 |
| 2,349,810 | Cook | May 30, 1944 |
| 2,504,997 | Mason | Apr. 25, 1950 |
| 2,518,405 | Van Duuren | Aug. 8, 1950 |
| 2,609,451 | Hanson | Sept. 2, 1952 |
| 2,614,169 | Cohen et al. | Oct. 14, 1952 |
| 2,642,493 | Locke et al. | June 16, 1953 |
| 2,667,533 | Zenner | Jan. 26, 1954 |
| 2,706,215 | Van Duuren | Apr. 12, 1955 |
| 2,709,042 | Couffignal | May 24, 1955 |
| 2,735,889 | Canfora | Feb. 21, 1956 |
| 2,771,599 | Nolde | Nov. 20, 1956 |
| 2,801,406 | Lubkin | July 30, 1957 |